United States Patent
Doersch et al.

(10) Patent No.: US 12,530,574 B2
(45) Date of Patent: Jan. 20, 2026

(54) CROSS-TRANSFORMER NEURAL NETWORK SYSTEM FOR FEW-SHOT SIMILARITY DETERMINATION AND CLASSIFICATION

(71) Applicant: GDM Holding LLC, Mountain View, CA (US)

(72) Inventors: Carl Doersch, London (GB); Ankush Gupta, London (GB); Andrew Zisserman, London (GB)

(73) Assignee: GDM Holding LLC, Mountain View, CA (US)

( * ) Notice: Subject to any disclaimer, the term of this patent is extended or adjusted under 35 U.S.C. 154(b) by 976 days.

(21) Appl. No.: 17/338,809

(22) Filed: Jun. 4, 2021

(65) Prior Publication Data
US 2021/0383226 A1 Dec. 9, 2021

Related U.S. Application Data

(60) Provisional application No. 63/039,748, filed on Jun. 16, 2020, provisional application No. 63/035,469, filed on Jun. 5, 2020.

(51) Int. Cl.
*G06N 3/08* (2023.01)
*G06N 3/044* (2023.01)

(52) U.S. Cl.
CPC ............ *G06N 3/08* (2013.01); *G06N 3/044* (2023.01)

(58) Field of Classification Search
CPC ................................. G06N 3/08; G06N 3/044
See application file for complete search history.

(56) References Cited

U.S. PATENT DOCUMENTS

| | | | |
|---|---|---|---|
| 2019/0130213 A1 | 5/2019 | Shazeer et al. | |
| 2020/0143209 A1* | 5/2020 | Lacoste | G06N 3/08 |
| 2020/0334490 A1* | 10/2020 | Shen | G06N 3/08 |

FOREIGN PATENT DOCUMENTS

| | | |
|---|---|---|
| CN | 109840538 A | 6/2019 |
| CN | 109952583 A | 6/2019 |

(Continued)

OTHER PUBLICATIONS

Garnot, Vivien Sainte Fare, Loic Landrieu, Sebastien Giordano, and Nesrine Chehata. "Satellite image time series classification with pixel-set encoders and temporal self-attention." In Proceedings of the IEEE/CVF Conference on Computer Vision and Pattern Recognition, pp. 12325-12334. 2020. (Year: 2020).*

(Continued)

*Primary Examiner* — Kamran Afshar
*Assistant Examiner* — Simon Fischer Ellis
(74) *Attorney, Agent, or Firm* — Fish & Richardson P.C.

(57) ABSTRACT

There is described a neural network system for determining a similarity measure between a query data item and a set of support data items. The neural network system is implemented by one or more computers and one or more storage devices storing instructions that when executed by the one or more computers cause the one or more computers to perform operations comprising receiving the query data item and obtaining a support set of one or more support data items comprising a support key embedding and a support value embedding for each respective support data item in the support set. The operations further comprise generating a query key embedding for the query data item using a key embedding neural network subsystem configured to process a data item to generate a key embedding.

18 Claims, 5 Drawing Sheets

(56) References Cited

FOREIGN PATENT DOCUMENTS

| CN | 110945500 A | 3/2020 |
|---|---|---|
| CN | 111046910 A | 4/2020 |
| JP | 2020071694 | 5/2020 |

OTHER PUBLICATIONS

International Search Report and Written Opinion in International Appln. No. PCT/EP2021/065125, dated Dec. 13, 2021, 23 pages.
International Preliminary Report on Patentability in International Appln. No. PCT/EP2021/065125, dated Dec. 15, 2022, 16 pages.
Arandjelovic et al., "Look, listen and learn," Proceedings of the IEEE International Conference on Computer Vision, 2017, pp. 609-617.
Bachman et al., "Learning representations by maximizing mutual information across views," CoRR, Jul. 2019, arxiv.org/abs/1906.00910, 11 pages.
Bahdanau et al., "Neural machine translation by jointly learning to align and translate," CoRR, May 2016, arxiv.org/abs/1409.0473, 15 pages.
Bart et al., "Cross-generalization: Learning novel classes from a single example by feature replacement," 2005 IEEE Computer Society Conference on Computer Vision and Pattern Recognition, Jun. 2005, 8 pages.
Bengio et al., "Learning a synaptic learning rule," Université de Montréal, Département d'informatique et de recherche opérationnelle, Nov. 1990, 6 pages.
Bengio et al., "On the optimization of a synaptic learning rule," Preprints Conf. Optimality in Artificial and Biological Neural Networks, 1992, 2:29 pages.
Bertinetto et al., "Learning feed-forward one-shot learners," Advances in Neural Information Processing Systems 29, 2016, 9 pages.
Bromley et al., "Signature verification using a "siamese" time delay neural network," International Journal of Pattern Recognition and Artificial Intelligence, 1993, 7(4):669-688.
Bronstein et al., "Partial similarity of objects, or how to compare a centaur to a horse," International Journal of Computer Vision, Jul. 2008, 84(163):163-183.
Caron et al., "Deep clustering for unsupervised learning of visual features," Proceedings of the European Conference on Computer Vision, 2018, pp. 132-149.
Chatfield et al., "Efficient on-the-fly category retrieval using convnets and gpus," Asian Conference on Computer Vision, Apr. 2015, pp. 129-145.
Chen et al., "A simple framework for contrastive learning of visual representations," CoRR, Jul. 2020, arXiv:2002.05709, 20 pages.
Chopra et al., "Learning a similarity metric discriminatively, with application to face verification," 2005 IEEE Computer Society Conference on Computer Vision and Pattern Recognition, Jun. 2005, 8 pages.
Cortés, "Finite-time convergent gradient flows with applications to network consensus," Automatica, Nov. 2006, 42(11):1993-2000.
Cubuk et al., "Autoaugment: Learning augmentation strategies from data," Proceedings of the IEEE/CVF Conference on Computer Vision and Pattern Recognition, 2019, pp. 113-123.
Doersch et al., "Multi-task self-supervised visual learning," Proceedings of the IEEE International Conference on Computer Vision In Proceedings of the IEEE, 2017, pp. 2051-2060.
Doersch et al., "Unsupervised visual representation learning by context prediction," Proceedings of the IEEE International Conference on Computer Vision, 2015, pp. 1422-1430.
Doersch et al., "What makes paris look like paris?," ACM Transactions on Graphics, Association for Computing Machinery, 2012, 31(4):hal-01053876.
Donahue et al., "Adversarial feature learning," CoRR, Apr. 2017, arXiv:1605.09782, 18 pages.
Donahue et al., "Large scale adversarial representation learning," CoRR, Nov. 2019, arxiv.org/abs/1907.02544, 32 pages.
Dosovitskiy et al., "Discriminative unsupervised feature learning with convolutional neural networks," Advances in Neural Information Processing Systems 27, 2014, 27:766-74.
Fei-Fei et al., "One-shot learning of object categories," IEEE Transactions on Pattern Analysis and Machine Intelligence, Apr. 2006, 28(4):594-611.
Felzenszwalb et al., "Object detection with discriminatively trained part-based models," IEEE Transactions on Pattern Analysis and Machine Intelligence, Sep. 2010, 32(9):1627-1645.
Finn et al., "Model-agnostic meta-learning for fast adaptation of deep networks," Proceedings of the 34th International Conference on Machine Learning, 2017, 70:1126-1135.
Garcia et al., "Few-shot learning with graph neural networks," CoRR, Feb. 2018, arxiv.org/abs/1711.04043, 13 pages.
Gidaris et al., "Boosting few-shot visual learning with self-supervision," Proceedings of the IEEE/CVF International Conference on Computer Vision, 2019, pp. 8059-8068.
Gidaris et al., "Dynamic few-shot visual learning without forgetting," Proceedings of the IEEE Conference on Computer Vision and Pattern Recognition, 2018, pp. 4367-4375.
Gidaris et al., "Unsupervised representation learning by predicting image rotations," CoRR, Mar. 2018, arxiv.org/abs/1803.07728, 16 pages.
Girshick et al., "Rich feature hierarchies for accurate object detection and semantic segmentation," Proceedings of the IEEE Conference on Computer Vision and Pattern Recognition, 2014, pp. 580-587.
Gomez et al., "Evolving modular fast-weight networks for control," International Conference on Artificial Neural Networks, 2005, pp. 383-389.
Ha et al., "Hypernetworks," CoRR, Dec. 2016, arXiv:1609.09106, 29 pages.
Hadsell et al., "Dimensionality reduction by learning an invariant mapping," 2006 IEEE Computer Society Conference on Computer Vision and Pattern Recognition, Jun. 2006, 2:1735-1742.
Han et al., "Face recognition with contrastive convolution," Proceedings of the European Conference on Computer Vision, 2018, pp. 118-134.
Han et al., "Matchnet: Unifying feature and metric learning for patch-based matching, " Proceedings of the IEEE Conference on Computer Vision and Pattern Recognition, 2015, pp. 3279-3286.
Hariharan et al., "Low-shot visual recognition by shrinking and hallucinating features," Proceedings of the IEEE International Conference on Computer Vision, 2017, 10 pages.
He et al., "Momentum contrast for unsupervised visual representation learning," CoRR, Mar. 2020, arXiv:1911.05722, 12 pages.
He et al., "Momentum contrast for unsupervised visual representation learning," Proceedings of the IEEE/CVF Conference on Computer Vision and Pattern Recognition, 2020, pp. 9729-9738.
He et al., "Deep Residual Learning for Image Recognition," CoRR, Dec. 2015, arXiv:1512.03385, 12 pages.
Hjelm et al., "Learning deep representations by mutual information estimation and maximization," CoRR, Feb. 2019, arXiv:1808.06670, 24 pages.
Hochreiter et al., "Learning to learn using gradient descent," International Conference on Artificial Neural Networks, Aug. 2001, pp. 87-94.
Jacobs et al., "Class representation and image retrieval with non-metric distances," IEEE Trans. Pattern Anal. Mach. Intell., Jun. 2000, 22(6):583-600.
Jason et al., "Back to basics: Unsupervised learning of optical flow via brightness constancy and motion smoothness," European Conference on Computer Vision, Oct. 2016, pp. 3-10.
Juneja et al., "Blocks that shout: Distinctive parts for scene classification," Proceedings of the IEEE Conference on Computer Vision and Pattern Recognition, 2013, pp. 923-930.
Kaiser et al., "Learning to remember rare events," CoRR, Mar. 2017, arxiv.org/abs/1703.03129, 10 pages.
Koch et al., "Siamese neural networks for one-shot image recognition," Thesis for the degree of Master of Science, University of Toronto, School of Engineering Sciences, Jul. 2015, 30 pages.

(56) References Cited

OTHER PUBLICATIONS

Lake et al., "Concept learning as motor program induction: A large-scale empirical study," Proceedings of the Annual Meeting of the Cognitive Science Society, 2012, 34(34):659-664.
Lake et al., "Human-level concept learning through probabilistic program induction," Science, Dec. 2015, 350(6266):1332-1338.
Larsson et al., "Learning representations for automatic colorization," European Conference on Computer Vision, Sep. 2016, pp. 577-593.
Li et al., "Probabilistic elastic matching for pose variant face verification," Proceedings of the IEEE Conference on Computer Vision and Pattern Recognition, 2013, pp. 3499-3506.
Lifchitz et al., "Dense classification and implanting for few-shot learning," Proceedings of the IEEE/CVF Conference on Computer Vision and Pattern Recognition, 2019, pp. 9258-9267.
Lin et al., "Microsoft COCO: Common objects in context," European Conference on Computer Vision, 2014, pp. 740-755.
Liu et al., "Selflow: Self-supervised learning of optical flow," Proceedings of the IEEE/CVF Conference on Computer Vision and Pattern Recognition, 2019, pp. 4571-4580.
Maclaurin et al., "Gradient-based hyperparameter optimization through reversible learning," Proceedings of the 32nd International Conference on Machine Learning, 2015, pp. 37:2113-2122.
Maji et al., "Fine-grained visual classification of aircraft," CoRR, Jun. 2013, arXiv:1306.5151, 6 pages.
Miller et al., "Learning from one example through shared densities on transforms," Proceedings IEEE Conference on Computer Vision and Pattern Recognition. CVPR 2000 (Cat. No. PR00662), Jun. 2000, 8 pages.
Mishra et al., "A simple neural attentive meta-learner," CoRR, Feb. 2018, arxiv.org/abs/1707.03141, 17 pages.
Misra et al., "Self-supervised learning of pretext-invariant representations," CoRR, Dec. 2019, arXiv:1912.01991, 14 pages.
Munkhdalai et al., "Meta networks," Proceedings of the 34th International Conference on Machine Learning, 2017, 70:2554-2563.
Naik et al., "Meta-neural networks that learn by learning," [Proceedings 1992] IJCNN International Joint Conference on Neural Networks, Jun. 1992, 1:437-442.
Nichol et al., "On first-order meta-learning algorithms," CoRR, Oct. 2018, arXiv:1803.02999, 15 pages.
Noroozi et al., "Unsupervised learning of visual representations by solving jigsaw puzzles," European Conference on Computer Vision, Sep. 2016, pp. 70-84.
Oord et al., "Representation learning with contrastive predictive coding," CoRR, Jul. 2018, arXiv:1807.03748, 13 pages.
Oord et al., "Wavenet: A generative model for raw audio," arXiv preprint arXiv:1609.03499, 2016, 15 pages.
Oquab et al., "Learning and transferring mid-level image representations using convolutional neural networks," Proceedings of the IEEE Conference on Computer Vision and Pattern Recognition, 2014, pp. 1717-1724.
Pathak et al., "Context encoders: Feature learning by inpainting," Proceedings of the IEEE Conference on Computer Vision and Pattern Recognition, 2016, pp. 2536-2544.
Pathak et al., "Learning features by watching objects move," CoRR, Apr. 2017, arxiv.org/abs/1612.06370, 10 pages.
Perez et al., "FILM: Visual reasoning with a general conditioning layer," Proceedings of the AAAI Conference on Artificial Intelligence, Apr. 2018, 32(1):3942-3951.
Qi et al., "Low-shot learning with imprinted weights," Proceedings of the IEEE Conference on Computer Vision and Pattern Recognition, 2018, pp. 5822-5830.
Qiao et al., "Few-shot image recognition by predicting parameters from activations," Proceedings of the IEEE Conference on Computer Vision and Pattern Recognition, 2018, pp. 7229-7238.
Raghu et al., "Rapid learning or feature reuse? towards understanding the effectiveness of maml," CoRR, Feb. 2020, arxiv.org/abs/1909.09157, 21 pages.
Ravi et al., "Optimization as a model for few-shot learning," ICLR 2017 Conference, Mar. 2017, 11 pages.
Rebuffi et al., "Learning multiple visual domains with residual adapters," CoRR, Nov. 2017, arxiv.org/abs/1705.08045, 12 pages.
Requeima et al., "Fast and flexible multi-task classification using conditional neural adaptive processes," Advances in Neural Information Processing Systems, 2019, 32:7959-70.
Rocco et al., "Neighbourhood consensus networks," CoRR, Nov. 2018, arxiv.org/abs/1810.10510, 20 pages.
Russakovsky et al., "Imagenet large scale visual recognition challenge," International Journal of Computer Vision, Apr. 2015, 115(3):211-252.
Saikia et al., "Optimized generic feature learning for few-shot classification across domains," CoRR, Jan. 2022, arXiv:2001.07926, 13 pages.
Santoro et al., "Meta-learning with memory augmented neural networks," proceedings of The 33rd International Conference on Machine Learning, 2016, 48:1842-1850.
Savarese et al., "Discriminative object class models of appearance and shape by correlatons," 2006 IEEE Computer Society Conference on Computer Vision and Pattern Recognition, Jun. 2006, 8 pages.
Schmidhuber, "A neural network that embeds its own meta-levels," IEEE International Conference on Neural Networks, Apr. 1993, pp. 407-412.
Schmidhuber, "Learning to control fast-weight memories: An alternative to dynamic recurrent networks," Neural Computation, Jan. 1992, 4(1):131-139.
Sivic et al., "Video google: A text retrieval approach to object matching in videos," Proceedings Ninth IEEE International Conference on Computer Vision, Oct. 2003, 8 pages.
Snell et al., "Prototypical networks for few-shot learning," CoRR, Jun. 2017, arxiv.org/abs/1703.05175, 13 pages.
Sprechmann et al., "Memory-based parameter adaptation," CoRR, Feb. 2018, arxiv.org/abs/1802.10542, 16 pages.
Sung et al., "Learning to compare: Relation network for few-shot learning," Proceedings of the IEEE Conference on Computer Vision and Pattern Recognition, 2018, pp. 1199-1208.
Thrun, "Lifelong learning algorithms," Learning to Learn, 1998, 29 pages.
Tian et al., "Contrastive multiview coding," CoRR, Dec. 2020, arXiv:1906.05849, 16 pages.
Triantafillou et al., "Meta-dataset: A dataset of datasets for learning to learn from few examples," CoRR, Apr. 2020, arxiv.org/abs/1903.03096, 24 pages.
Vaswani et al., "Attention is all you need," Advances in Neural Information Processing Systems 30, 2017, 11 pages.
Veltkamp et al., "Shape matching: Similarity measures and algorithms," Proceedings International Conference on Shape Modeling and Applications, May 2001, 17 pages.
Vilalta et al., "A perspective view and survey of meta-learning," Artificial Intelligence Review, Jun. 2002, 18:77-95.
Vinyals et al., "Matching networks for one shot learning," 30th Conference on Neural Information Processing Systems, 2016, 9 pages.
Vondrick et al., "Tracking emerges by colorizing videos," Proceedings of the European Conference on Computer Vision, 2018, pp. 391-408.
Wah et al., "The caltech-ucsd birds-200-2011 Dataset," Computation & Neural Systems Technical Report, CNS-TR, California Institute of Technology, last modified on Oct. 26, 2011, 8 pages.
Wang et al., "Learning to model the tail," 31st Conference on Neural Information Processing Systems, 2017, 11 pages.
Wang et al., "Low-shot learning from imaginary data," Proceedings of the IEEE Conference on Computer Vision and Pattern Recognition, 2018, pp. 7278-7286.
Wang et al., "Non-local neural networks," Proceedings of the IEEE Conference on Computer Vision and Pattern Recognition, 2018, pp. 7794-7803.
Xie et al., "Comparator networks," Proceedings of the European Conference on Computer Vision, 2018, pp. 782-797.

(56) References Cited

OTHER PUBLICATIONS

Ye et al., "Unsupervised embedding learning via invariant and spreading instance feature," Proceedings of the IEEE/CVF Conference on Computer Vision and Pattern Recognition, 2019, pp. 6210-6219.

Younger et al., "Meta-learning with backpropagation," IJCNN'01, International Joint Conference on Neural Networks. Proceedings (Cat. No. 01CH37222), Jul. 2001, 3:2001-2006.

Zagoruyko et al., "Wide residual networks," CoRR, Jun. 2017, arxiv.org/abs/1605.07146, 15 pages.

Zhang et al., "Colorful image colorization," European Conference on Computer Vision, Sep. 2016, pp. 649-666.

Zhang et al., "Local features and kernels for classification of texture and object categories: A comprehensive study," International Journal of Computer Vision, Sep. 2006, 73:213-238.

Zhang et al., "Self-attention generative adversarial networks," Proceedings of the 36th International Conference on Machine Learning, 2019, 2019, 97:7354-7363.

Zhang et al., "Split-brain autoencoders: Unsupervised learning by cross-channel prediction," Proceedings of the IEEE Conference on Computer Vision and Pattern Recognition, 2017, pp. 1058-1067.

Zheng et al., "Learning multi-attention convolutional neural network for fine-grained image recognition," Proceedings of the IEEE International Conference on Computer Vision, 2017, pp. 5209-5217.

Doersch et al., "CrossTransformers: spatially-aware few-shot transfer," 34th Conference on Neural Information Processing Systems, 2020, 24 pages.

Invitation to Pay Additional Fees in International Appln. No. PCT/EP2021/065125, dated Oct. 20, 2021, 17 pages.

Ke et al., "Compare Learning: Bi-Attention Network for Few-Shot Learning, " 2020 International Conference on Acoustics, Speech, and Signal Processing, 2020, pp. 2233-2237.

Ye et al., "Learning Embedding Adaptation for Few-Shot Learning," Proceedings of the IEEE/CVF Conference on Computer Vision and Pattern Recognition, 2020, pp. 8808-8817.

Office Action in Japanese Appln. No. 2022-560956, dated Jan. 29, 2024, 6 pages (with English translation).

Andrychowicz et al., "Learning to learn by gradient descent by gradient descent," Advances in Neural Information Processing Systems 29, 2016, 9 pages.

Decision to Grant a Patent in Japanese Appln. No. 2022-560956, dated May 27, 2024, 5 pages (with English translation).

Office Action in Japanese Appln. No. 2024-102341, mailed on Mar. 18, 2025, 6 pages (with English translation).

Notice of Allowance in Japanese Appln. No. 2024-102341, mailed on Sep. 9, 2025, 5 pages (with English translation).

Office Action in Chinese Appln. No. 202180025868.5, mailed on Dec. 5, 2025, 20 pages (with English translation).

\* cited by examiner

CROSS-TRANSFORMER NEURAL NETWORK SYSTEM FOR FEW-SHOT SIMILARITY DETERMINATION AND CLASSIFICATION

CROSS-REFERENCE TO RELATED APPLICATION

This application claims priority under 35 U.S.C. 119 to Provisional Application Nos. 63/039,748, filed Jun. 16, 2020, and 63/035,469, filed Jun. 5, 2020, both which are incorporated by reference.

BACKGROUND

This specification relates to a neural network system for few-shot similarity determination and classification.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system comprising one or more computers and one or more storage devices storing instructions that when executed by the one or more computers cause the one or more computers to implement a neural network system for determining a similarity measure between a query data item and a set of support data items. The neural network system is particularly suitable for use in "few-shot" applications for which only a limited number of examples of particular categories are available and the neural network system must be able to recognize data items from these categories based on the limited number of example data items. The example data items may be referred to as a support set whilst the data item to be recognized may be referred to as a query data item. The neural network system described herein is capable of recognizing query data items in categories that have not been seen during training and does not require re-training in order to recognize query data items in these novel categories. Rather, the neural network system provides an improved mechanism for determining similarity between a query data item and support data items. In addition, the neural network system is trained to provide representations of data items that are more generally applicable to all data items and can transfer to novel categories more easily.

In implementations, the following operations may be performed by the one or more computers implementing the neural network system. A query data item may be received. A support set of one or more support data items comprising a support key embedding and a support value embedding for each respective support data item in the support set may be obtained. A query key embedding for the query data item may be generated using a key embedding neural network subsystem configured to process a data item to generate a key embedding. An attention map may be generated based upon a similarity between the query key embedding and the support key embedding for each respective support data item. A query value embedding may be generated for the query data item using a value embedding neural network subsystem configured to process a data item to generate a value embedding. A similarity measure between the query data item and the support set may be determined based upon the attention map, the support value embedding for each respective support data item and the query value embedding.

The key and value embeddings may be representations of the query data item and support data items that enable comparisons of the features of the query data item and support data items to be made more easily. Thus, the similarity between the query key embedding and the support key embedding for each respective support data item may be indicative of whether particular features of the query data item are present in the support data items.

The attention map may be used to guide the system as to which parts of the support data items may be important for determining the similarity between the query data item and support data items.

The support key embeddings may be generated using the key embedding neural network subsystem. The support value embeddings may be generated using the value embedding neural network. That is, the same key embedding neural network subsystem may be used to generate the key embedding for the query data item and the support data items, and likewise the same value embedding neural network may be used to generate the value embeddings. In this way, both the query data item and support data items are represented in the same feature space for comparison.

For improved efficiency, the support key embeddings and the support value embeddings may be generated once and stored in a cache or other data store for later retrieval whenever a new query data item is to be processed. Alternatively, the support key embeddings and the support value embeddings may be generated outside of the system and provided to the system as appropriate.

The support data items may be associated with one or more categories. The support set may comprise support data items associated with a corresponding one or more of a plurality of categories. In particular, each of the data support items may be associated with a corresponding one of the categories. Each support item may be associated with a label indicating which of the categories it is associated with; for example a certain support item may be labelled with a first category, showing that it is associated with that category. As discussed above, the plurality of categories may be categories that were not part of the training dataset used to train the neural network system and there may be a limited number of support data items associated with each category in the support set. The query data item may be classified based upon similarity measures determined for each respective category.

The support value embedding may be weighted based upon the attention map. The weighted support value embedding for the support data items associated with the same category may be aggregated to generate a prototype for each category associated with the support set. That is, the weighted support value embeddings corresponding to support data items labelled with a first category may be aggregated to form a prototype for the first category. The weighted support value embeddings corresponding to support data items labelled with a second category may be aggregated to form a prototype for a second category and so on for further categories.

The aggregation may be a sum, an average or other appropriate aggregation function. The aggregation may be such that a particular position in the prototype is indicative of whether a feature at the corresponding position in the query data item or query key embedding is present in the support data items or support key embeddings associated with the prototype category.

Determining the similarity measure may comprise determining a similarity measure between the query value embedding and the prototype. The similarity measure may be based upon a distance between the query value embedding and the prototype. The distance may be based upon a Euclidean distance. Alternatively, other distances such a cosine distance may be used as appropriate. The distance may be indicative of the likelihood that the query data item belongs a particular category of the support set. The distance or other similarity measure may be used as a logit for a softmax function for classification. Alternatively, a classifier, such as a neural network-based classifier, may be used to perform the classification. The classifier may perform the classification based upon the query value embeddings and the prototypes for each category or other appropriate combination of inputs.

The similarity between the query key embedding and the support key embedding for each respective support data item may be based upon a dot product. For example, elements at corresponding positions in the embeddings may be multiplied together. As discussed above, the similarity between the query key embedding and the support key embedding for each respective support data item may be based upon a similarity between a feature of the query key embedding and each respective feature of the support key embedding. The features may be spatial features. For example, a region of an image.

It will be appreciated that the similarity between the query key embedding and the support key embedding for each respective support data item may not require normalization or a normalization constant in the similarity computation. For example, the similarity computation may be a dot product between the query key embedding and the support key embedding. The result of the dot product may be normalized based upon an L-2 norm of the query and support key embeddings. The L-2 norm may be viewed as a normalization constant (or a scaling constant). However, such a normalization constant may not be necessary. By using the raw (unscaled) similarity values, the attention map may exhibit sharper peaks which may help to improve the accuracy of the similarity determination. The attention map may therefore be generated based upon an unscaled similarity measure between the query key embedding and the support key embedding for each respective support data item.

The attention map may be generated based upon a softmax function which receives the similarities between the query key embedding and the support key embedding for each respective support data item of the same category. That is, the similarities for the support data items of a first category may be input to the softmax function to normalize the similarity values across the first category. The softmax function may further comprise a temperature parameter.

The key embedding neural network subsystem and/or the value embedding subsystem may each comprise a linear output layer. The key embedding neural network subsystem and/or the value embedding subsystem may each comprise a convolutional layer. The key embedding neural network subsystem and the value embedding neural network subsystem may share a portion of the same neural network layers. For example, both neural network subsystems may share an initial ResNet-type neural network structure with separate linear output layers on top of the ResNet structure to produce the key embedding and value embeddings.

The query data item and support data items may be images. The categories associated with the support data items may be categories of objects present in the images. Thus the system may be used for object recognition. The system may also be used for other tasks such as object detection and segmentation. The data items may be video data. The categories may be actions being performed in the video data. The data items may be utterances of speech and the system may be used for speech recognition.

In one exemplary implementation, the data items are images. A support set of images is provided to the system. The support set comprises images of objects that the neural network system has not been trained to classify. A query image to be classified is received by the system. The ResNet-type neural network is used to generate feature maps for the query image and the support images. A linear projection is used to generate key embeddings based upon the feature maps for query image and the support images. The key embeddings for the query image and support images of a particular object category are compared using a dot product attention and normalized across all spatial positions and support images using a softmax function to produce an attention map. A second linear projection is used to generate value embeddings from the query feature maps and support feature maps. The attention map is used to weight the support value embeddings and the weighted support value embeddings are aggregated to form a prototype for each object category. A distance is computed between the query value embedding and each of the object category prototypes. A softmax function over the distances is used to obtain a probability that the query image comprises an object belonging to one of the object categories of the support set. It will be appreciated that this implementation is exemplary and non-limiting and that other implementations are possible in combination with alternative features as described above.

There is also provided a method of determining a similarity measure between a query data item and a set of support data items comprising the operations implemented by the neural network system as described above.

There is further provided a method of training a neural network system for determining a similarity measure between a query data item and a set of support data items. The method may comprise receiving an episodic training dataset comprising training data items grouped into a plurality of training episodes. Each training episode may comprise training data items partitioned into a support set of support training data items and a query set. A training episode may be selected for modification. For each of a plurality of support training data items in the support set of the selected training episode, first and second transformed versions of the support training data items may be generated. The first and second transformed versions may be labelled with a label indicating the original support training data item. A new query set for the training episode may be generated based upon the second transformed versions of the support training data items. A modified episodic training dataset may be generated by replacing the query set of the selected training episode with the new query set. A neural network may be generated using a training set comprising the modified episodic training dataset.

In the modified training episodes, transforming support training data items into first and second transformed versions and labelling with a label indicating the original training data item modifies the training task for the selected training episode to be recognition of individual data items from transformed versions of the data item. By training in this way, a neural network may learn features that are more generalizable and can be used to differentiate data items that are outside of the distribution of the training dataset including never before seen categories of data items—something that neural networks often have difficulty with.

As the modified training episodes do not require external labels, the modified training episode is a form of self-supervised learning.

The modification of the training episode is such that the neural network training may be carried out without the need to modify the underlying training algorithm. The neural network training may therefore be carried out using a mixture of the original training episodes and modified training episodes. For example, one half of the modified episodic training dataset (i.e. the dataset used for training the neural network) may comprise modified training episodes and the other half original unmodified training episodes. The neural network may therefore be generated based upon the same loss function for both modified and unmodified training episodes.

The original training episodes may each be a supervised classification task with the aim of classifying the data items in the query set based upon the provided training data items in the support set. As such, the loss function may be a classification loss function and may be a cross-entropy loss function. By training based upon a mixture of modified and unmodified training episodes, the problem of "supervision collapse" may be mitigated. In standard supervised training of neural networks, it is possible that neural network only retains the information required to discriminate between categories that appear in the training dataset and discards other potentially useful information that could help to distinguish data items of categories not seen in the training dataset. This is referred to as supervision collapse. The training based upon modified training episodes to distinguish individual data items from transformed versions encourages the neural network to learn general features of data items that may be transferrable across categories and even to unseen categories. For example, objects may be composed of simpler components and the neural network may learn to recognize these simpler components which may be used in representing and recognizing novel objects.

The method may further comprise modifying the support set of the selected training episode based upon the first transformed versions. For example, where a first transformed version of an original support training data item is generated, the original support training data item may be replaced, or may be supplemented, with the corresponding first transformed version to form a modified support set for the selected training episode. The support set may be further modified by removing the original support training data items for which a first transformed version has not been generated.

In another example, multiple first transformed versions may be generated for each respective support training data item in the support set of the selected training episode (or for at least some of the support training data items in the support set of the selected training episode). Second transformed versions of the support training data items may be generated for a respective subset of the support training data items in the support set of the selected training episode. The first transformed versions may form a replacement support set and the second transformed versions may form a replacement query set for the selected training episode.

A training episode may comprise a support set having 50 to 500 labelled data items from 5 to 50 categories. The query set may comprise two data items per category. The new query set of a modified training episode may comprise the same number of data items as the original query set and support data items for the new query set may be selected at random according to the same category distribution as the original query set.

An update of the neural network parameters may be carried out at the end of each training episode. It will be appreciated however that there may be fewer or greater numbers of data items in the support set and query set as deemed appropriate by a person skilled in the art and updates to the neural network parameters may be carried out at appropriate intervals as deemed appropriate by the skilled person. The neural network may be generated based upon a normalized stochastic gradient descent technique. That is, a global gradient may be scaled to have unit norm before applying updates.

The selection of the training episode(s) for modification may be carried out randomly. A transformed version of a support training data item may be generated by applying a transformation based upon a cropping operation, a color distortion operation or a Gaussian blur operation. Generating a transformed version of a support training data item may comprise applying a random transformation function (e.g. a transformation function selected randomly from a class of transformation functions) to the support training data item to generate a transformed version of the support data item. That is, the transformation operation may be selected randomly and any parameters for the transformation operation may also be selected randomly.

Different transformation operations and/or parameters may be used to generate each of the first transformed versions. Likewise, different transformation operations and/or parameters may be used to generate each of the second transformed versions. Alternatively, the method may further comprise determining a first transformation and a second transformation, wherein the first transformation is applied to each respective support data item to generate the first transformed version for each respective support data item; and wherein the second transformation is applied to each respective support data item to generate second transformed versions for each respective support data item. That is, within each modified training episode, the first transformed versions may all be generated using the same first transformation and likewise the second transformed versions may all be generated using the same second transformation.

Prior to the episodic training, a supervised pre-training phase may be carried out. That is, training data items may be individually classified on their own rather being than being grouped into episodes and partitioned into support sets and query sets. The supervised pre-training phase may be carried out until there is no further improvement in a metric evaluated on a validation set. An alternative supervised task to classification may be used for pre-training as appropriate.

It will be appreciated that the operations for modifying a training episode may be carried out in a different order to achieve the same effect. For example, it is possible to first select data items for the new query set, generate transformed versions of these new query data items and only then apply the first and second transformations to the support data items in the support set.

It will be further appreciated that the training method may generate a neural network having the features described above with respect to the neural network system for determining a similarity measure between a query data item and a set of support data items. Thus, a neural network generated by the training method may be used as one of the neural networks used to determine the similarity measure.

There is further provided another method for training a neural network for determining a similarity measure between a query data item and a set of support data items. The method may comprise receiving an episodic training dataset comprising training data items grouped into a plurality of training episodes. Each training episode may comprise training data items partitioned into a support set and a query set. A training episode may be selected for modification. For each support training data item in the support set of the selected training episode, first and second transformed versions of the support data item may be generated. The first and second transformed versions may be labelled with a label indicating the original training data item. One or more of the support data items may be selected to generate a new query set for the training episode based upon the first and second transformed versions of the selected support data items. The new query set may replace the original query set for the training episode. A neural network may be generated using a training set comprising the modified episodic training dataset. It will be appreciated that the features described above in the context of the previous training method may be combined with the features of this further training method.

The training methods may be implemented by a system comprising one or more computers and one or more storage devices storing instructions that when executed by the one or more computers cause the one or more computers to perform the operations of the training method.

In addition, there is provided one or more computer storage media storing instructions that when executed by one or more computers cause the one or more computers to implement the neural network system described above and/or perform the operations of the training methods described above.

The neural network system may be used as part of a computer vision system. For example, in a computer vision system for an autonomous vehicle or a robotic system. Unfamiliar objects are almost ubiquitous in real-world vision applications due to the so-called 'long tail' of objects that occur in real scenes. In another example, the system may be used as part of photo-organizing software which may need to create new categories on-the-fly. In addition to object recognition, the system may perform other computer vision tasks such as object detection and segmentation. Rare and novel objects may also be present in other domains, such as video and speech and the system may be used in conjunction with such other domains.

For example, the neural network system may be used in a language modelling system, an image/video processing system, or an action selection system. For example, tasks may include classification tasks, such as image processing tasks, speech recognition tasks, natural language processing tasks, word recognition tasks, or optical character recognition tasks. In addition, tasks may include reinforcement learning tasks where an agent interacts with one or more real or simulated environments to achieve one or more goals.

For language modelling tasks or translation of text from a source language to a target language using neural networks, the system may be configured to receive an input sequence of source embeddings representing a source sequence of words in a source natural language and to generate an output sequence of target embeddings representing a target sequence of words that is a translation of the source sequence into a target natural language. More generally, the system can be applied to other sequence transduction applications where a source sequence is a mapped to a target sequence.

The input data may comprise, for example, one or more of: image data, moving image/video data, motion data, speech data, audio data, an electronic document, data representing a state of an environment, and/or data representing an action. For example, the image data may comprise color or monochrome pixel value data. Such image data may be captured from an image sensor such as a camera or LIDAR sensor. The audio data may comprise data defining an audio waveform such as a series of values in the time and/or frequency domain defining the waveform; the waveform may represent speech in a natural language. The electronic document data may comprise text data representing words in a natural language. The data representing a state of an environment may comprise any sort of sensor data including, for example: data characterizing a state of a robot or vehicle, such as pose data and/or position/velocity/acceleration data; or data characterizing a state of an industrial plant or data center such as sensed electronic signals such as sensed current and/or temperature signals. The data representing an action may comprise, for example, position, velocity, acceleration, and/or torque control data or data for controlling the operation of one or more items of apparatus in an industrial plant or data center. These data may, generally, relate to a real or virtual, e.g. simulated, environment.

The output data may similarly comprise any sort of data. For example in a classification system the output data may comprise class labels for input data items. In a regression task the output data may predict the value of a continuous variable, for example a control variable for controlling an electronic or electromechanical system such as a robot, vehicle, data center or plant. In another example of a regression task operating on image or audio data the output data may define one or more locations in the data, for example the location of an object or of one or more corners of a bounding box of an object or the time location of a sound feature in an audio waveform. In a reinforcement learning system the output data may comprise, for example, data representing an action, as described above, the action to be performed by an agent operating an in environment, for example a mechanical agent such as a robot or vehicle.

The data representing an action may comprise, for example, data defining an action-value (Q-value) for the action, or data parameterizing a probability distribution where the probability distribution is sampled to determine the action, or data directly defining the action, for example in a continuous action space. Thus in a reinforcement learning system the neural network system may directly parameterize a probability distribution for an action-selection policy or it may learn to estimate values of an action-value function (Q-values). In the latter case multiple memories and respective output networks may share a common embedding network, to provide a Q-value for each available action.

The neural network can be configured to receive any kind of digital data input and to generate any kind of score, classification, or regression output based on the input.

For example, if the inputs to the neural network are images or features that have been extracted from images, the output generated by the neural network for a given image may be scores for each of a set of object categories, with each score representing an estimated likelihood that the image contains an image of an object belonging to the category.

As another example, if the inputs to the neural network are Internet resources (e.g., web pages), documents, or portions of documents or features extracted from Internet resources, documents, or portions of documents, the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

The subject matter described in this specification can be implemented in particular embodiments so as to realize one or more of the following advantages.

As discussed above, the neural network system is capable of recognizing data items belonging to categories that have not been seen by the neural network system during training. This can be done without the need for expensive re-training and compared to other prior art techniques may be performed as accurately, if not more so, with fewer support data items. As such, the neural network system may have reduced memory and storage requirements and reduced processor and power requirements to process a query data item.

The neural network system provides an improved comparison mechanism compared to prior art methods and also provides representations of the query data item and support data items that enables comparisons of the features of the query data item and support data items to be made more easily.

Further, the above described training method may achieve similar if not better performance than prior art methods at a faster rate and therefore the training method reduces overall processor and power requirements. The training method can mitigate the problem of supervision collapse and enable the neural network system to learn features that are more generally applicable for recognizing any data item such as component parts.

Throughout this specification, processing an image, e.g., using a neural network, refers to processing intensity values associated with the pixels of the image using the neural network.

DETAILED DESCRIPTION

This specification describes a neural network system for determining a similarity measure between a query data item and a set of support data items. The similarity measure may then be used for classifying the query data item according to a category associated with the support set.

In general, the neural network system uses key embeddings of the query data item and support data items to generate one or more attention maps. The attention maps may indicate which parts (e.g. features, elements etc.) of the support data items may be important for determining the similarity between the query data item and support data items. For example, the attention maps may indicate the location and likelihood of potentially correspondent parts of the query data item and the support data item. The similarity comparison between the query data items and support data items are carried out in a value embedding space taking account of the attention maps. The similarity measure may be considered as a local part-based comparison. The neural network system provides an improved mechanism for determining similarity between data items through this local part-based comparison, in particular for categories of data items that may not have been seen during training of the neural network system and where data for each category is limited. For example, there may be 10 or fewer support data items for each category.

Figure 1:
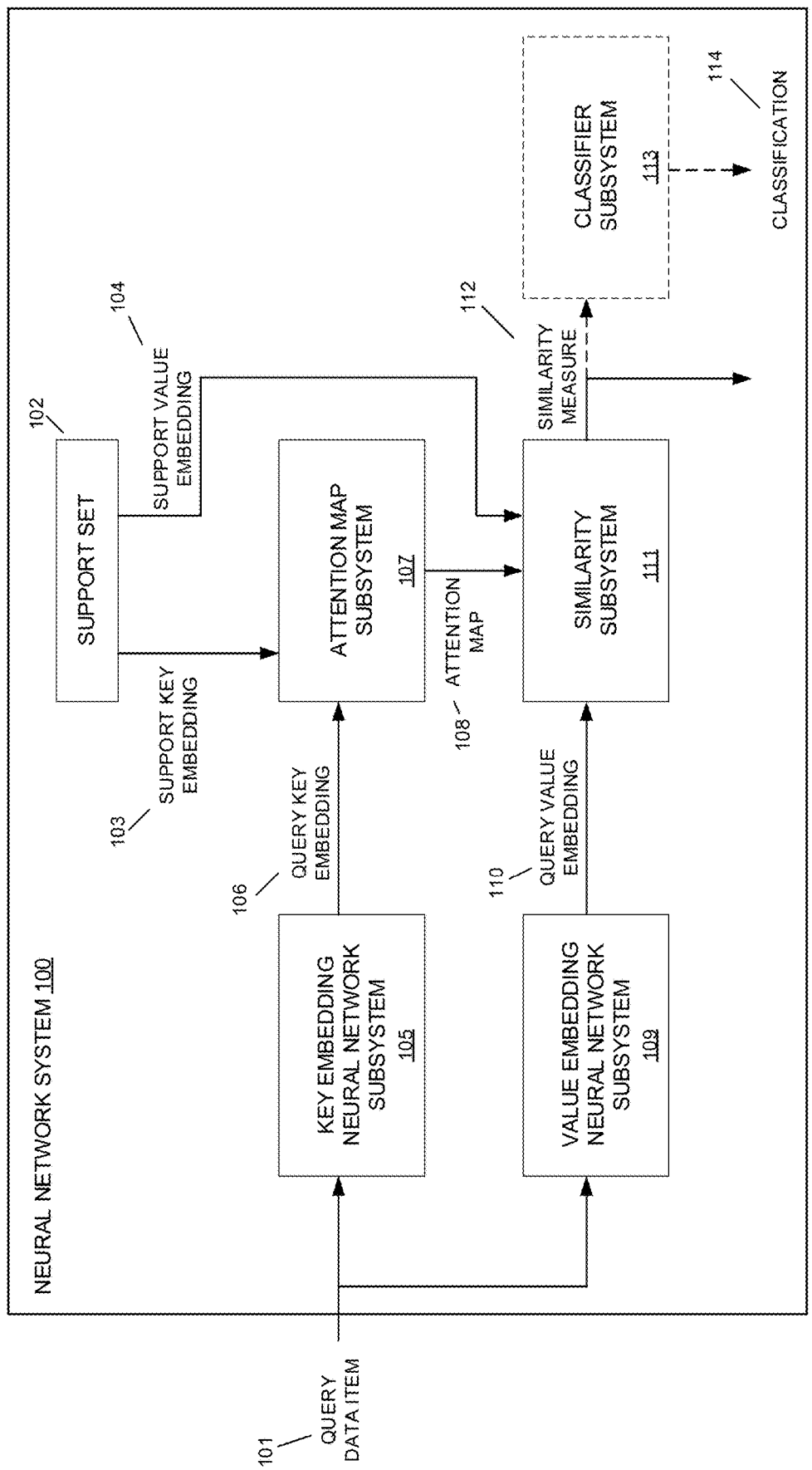
FIG. 1 is a block diagram of an example neural network system.

FIG. 1 shows an example of a neural network system 100. The neural network system 100 is an example of a system implemented as computer programs on one or more computers in one or more locations, in which the systems, components, and techniques described below can be implemented.

The neural network system 100 is configured to receive a query data item 101 and to obtain a support set of one or more data items 102 for which the query data item 101 is to be compared against and a similarity measure determined. The support set 102 comprises a support key embedding 103 and a support value embedding 104 for each respective support data item in the support set 102. The support set 102 may be retrieved from a memory or data storage device or may be received from a device external to the neural network system 100 or a combination of internal and external devices. For example, additional data items to supplement an existing support set may be received. The data items of the support set 102 may be associated with one or more categories. For example, if the data items are images, the categories may be a type of object present in the image.

The neural network system 100 comprises a key embedding neural network subsystem 105 which is configured to process a data item to generate a key embedding. In this case, the neural network system 100 is configured to generate a query key embedding 106 for the query data item 101 using the key embedding neural network subsystem 105. The neural network system 100 may also be configured to generate the support key embeddings 103 using the key embedding neural network subsystem 105. For example, if a data item of the support set was provided without a corresponding support key embedding 103 or if support key embedding 103 required re-generating, such as during training of the neural network system 100. The key embeddings may be a transformation of the query data item 101 and support data items into an embedding space that enables easier comparison of the data items.

Figure 5:
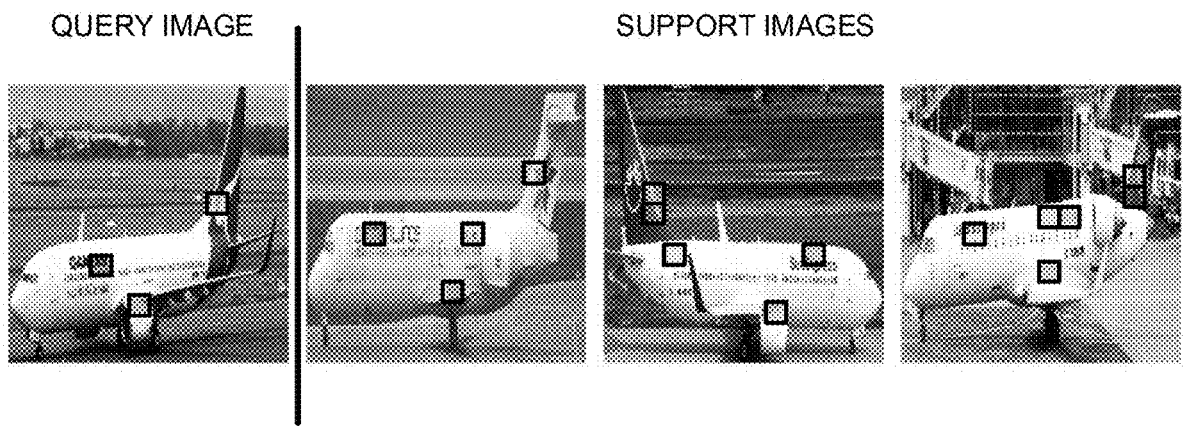
FIG. 5 is an illustration of determined correspondences between example query images and support set images.

The neural network system 100 further comprises an attention map subsystem 107. The neural network system 100 is configured to generate an attention map 108 based upon a similarity between the query key embedding 106 and the support key embedding 103 for each respective support data item using the attention map subsystem 107. The attention map 108 may be used to focus on, or attend to, particular features of the query data item and support data item that may be particularly significant for determining the similarity measure between the query data item 101 and the support set 102. The attention map 108 may indicate the location and likelihood of potentially corresponding features of the query data item 101 and a support data item. For example, where the data items are images, the attention map may indicate the location of corresponding spatial features between a query image and a support image. Example features may be the wheels of a car, the wings of an airplane, the petals of a flower etc. This is illustrated in FIG. 5 which is described in further detail below.

The attention map 108 may be generated based upon an unscaled similarity measure between the query key embedding 106 and the support key embedding 103 for each respective support data item. That is, the similarity measure may not require normalization and the computed raw values may be used as discussed above. The similarity between the query key embedding 106 and the support key embedding 103 for each respective support data item may be based upon a dot product. The similarity between the query key embedding 106 and the support key embedding 103 for each respective data item may be based upon a similarity between a feature of the query key embedding 106 and each respective feature of the support key embedding 103. For example, for each feature of the query key embedding 106, an attention map 108 may be generated as a result of the similarity comparison between the feature the query key embedding 106 and each respective feature of feature of the support key embedding 103.

The attention map 108 may further be generated based upon a softmax function which receives the similarity measures between the query key embedding 106 and the support key embedding 103 for each respective support data item of the same category. In this way, the values of the attention map 108 are normalized across the support data items of a particular category. In addition, the softmax function can also receive the similarities between each feature of the query key embedding 106 and each feature of the support key embedding 103. Thus, the values of the attention map (or maps where appropriate) may be normalized across features and within a particular category. Further details with respect to the generation of an attention map 108 are described below.

Continuing to refer to FIG. 1, the neural network system 100 also comprises a value embedding neural network subsystem 109 which is configured to process a data item to generate a value embedding. The neural network system 100 is configured to generate a query value embedding 110 for the query data item 101 using the value embedding neural network subsystem 109. The neural network system 100 may also be configured to generate the support value embeddings 104 using the value embedding neural network subsystem 109. For example, if a data item of the support set was provided without a corresponding support value embedding 104 or if the support value embedding 104 requires re-generating, such as during training of the neural network system 100.

The neural network system 100 additionally comprises a similarity subsystem 111 configured to determine a similarity measure 112. The neural network system 100 is configured to determine a similarity measure 112 between the query data item 101 and the support set 102 based upon the attention map 108, the support value embedding 104 for each respective support data item and the query value embedding 110. The similarity measure 112 may be a measure of the similarity between the query data item 101 and each respective support data item of the support set 102. For example, the support value embedding 104 may be weighted based upon a corresponding attention map 108 and therefore utilizes a form of soft-attention. A similarity measure between the query value embedding 110 and the weighted support value embedding may be determined.

Alternatively, the similarity measure 112 may be a measure of the similarity between the query data item 101 and an aggregate support data item generated based upon each respective support data item associated with the same category. For example, an aggregate support data item, also known as a prototype, may be generated for each category by aggregating the weighted support value embeddings for the support data items associated with the same category. A similarity measure between the query value embedding 110 and the prototype for each respective category may be determined.

The determined similarity measure 112 may be indicative of a likelihood that the query data item 101 belongs to a particular category associated with the support data items. The similarity measure 112 may be based upon a distance. For example, a distance between the query value embedding and a respective prototype. A smaller distance may indicate a higher likelihood of the query data item belonging to the category associated with the respective prototype. The distance may be a Euclidean distance or any other distance deemed appropriate by a person skilled in the art.

Further details with respect to determining the similarity measure 112 are described in more detail below. The neural network system 100 may also be configured to output the similarity measure 112.

The neural network system 100 may also comprise a classifier subsystem 113. The neural network system 100 may be configured to classify the query data item 101 based upon the determined similarity measure 112. For example, the classification may be based upon the determined similarity measures between the query data item 101 and each respective support data item or the classification may be based upon the determined similarity measures using the prototypes for each respective category. The classifier subsystem 113 may implement any appropriate type of classifier. For example, a softmax function may be used to convert the determined similarity measures into a probability distribution indicating the likelihood that the query data item belongs to each respective category. In another example, logistic regression or a neural network classifier may be used. The classification may be carried out using the classifier subsystem 113 which may provide an output classification 114.

The key embedding neural network subsystem 105 and the value embedding neural network subsystem 109 may comprise neural networks having a linear output layer. They may also comprise neural networks having a convolutional layer. The key embedding neural network subsystem 105 and the value embedding neural network subsystem 109 may comprise an initial set of shared neural network layers. In one example, all but the final respective output layers are shared. This shown in more detail in FIG. 2.

Figure 2:
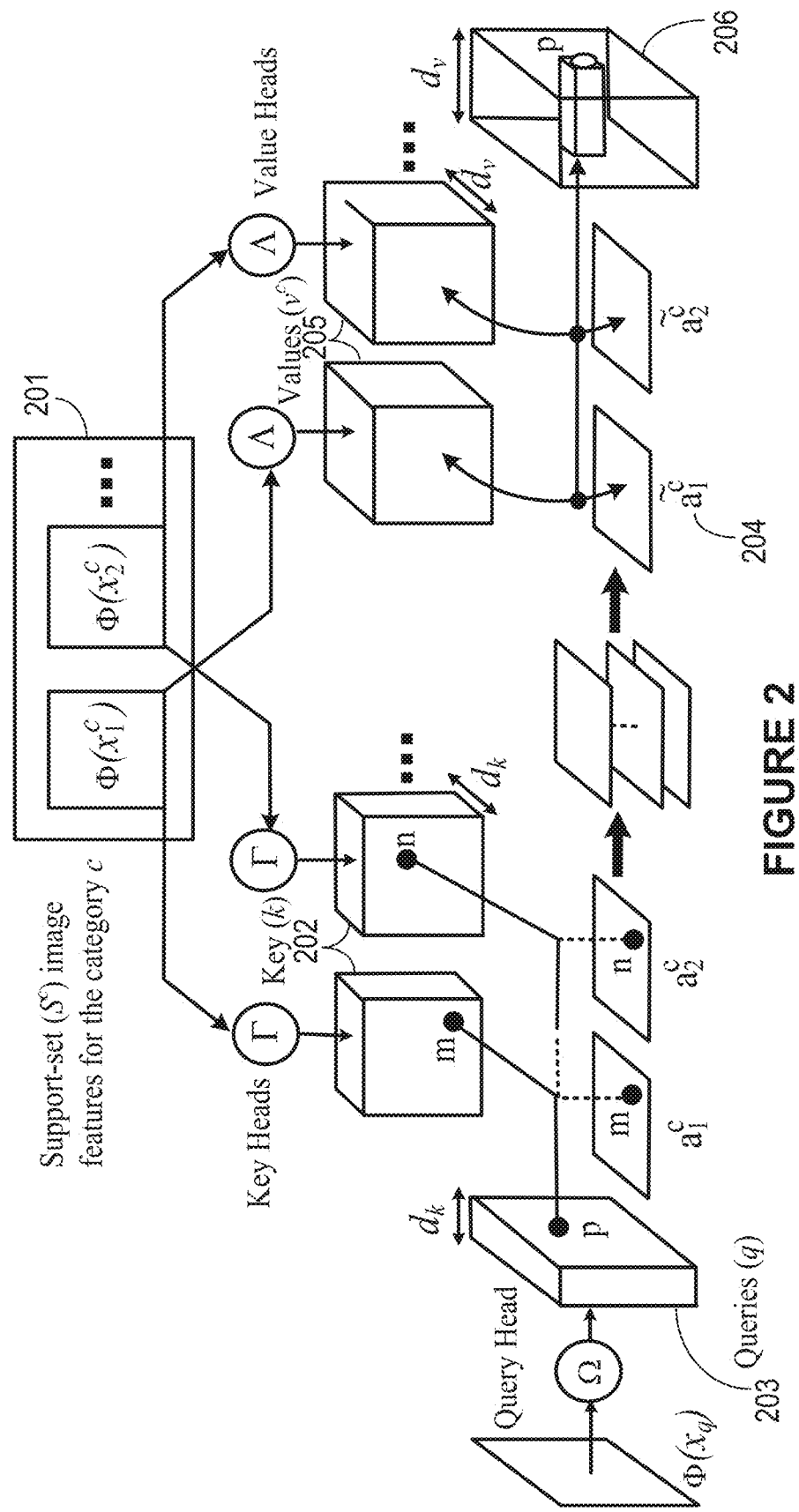
FIG. 2 is a schematic illustration of an example operation of the neural network system.

Referring now to FIG. 2, a schematic illustration of generating a prototype for a respective category using the neural network system 100 is shown. The following example is based upon image data as the modality of the query data item 101 and the support data items. It will be appreciated that similar processing can be applied to other modalities and types of data item such as audio signals and video.

In FIG. 2, a query image $x_q$ has first been transformed using function $\Phi(\cdot)$. The function $\Phi(\cdot)$ may be implemented using a neural network configured to process an image to generate a feature map representation of the image. For example, $\Phi(\cdot)$ may be implemented based upon a ResNet architecture of which further details may be found in He et. al., "Deep Residual Learning for Image Recognition," arXiv: 1512.03385, which is hereby incorporated by reference in its entirety.

Given an image x having a height (H), width (W) and 3 colour channels, $\Phi(\cdot)$ may generate image features having dimensions H'×W' and D channels. In one example, an image has a starting resolution of 224×224 and the output of function $\Phi(\cdot)$ (implemented with a ResNet-34 architecture with dilated final block) has 512 channels with a 14×14 grid. The function $\Phi(\cdot)$ may also be applied to images of the support set 201 as shown at the top of FIG. 2. The support set for a category c is denoted as $S^c$ and comprises support images, $x_j^c$ with j being an index over the support images in $S^c$. For example, both the query- and support-images can be encoded into a H'×W'×D-dimensional representation $\Phi(x)$, using a shared ConvNet $\Phi$.

The support set image features $\Phi(x_j^c)$ may be further processed by a key head to generate a support key embedding 202 for each respective support set image (also referred to as "Keys $k^c$" as shown in FIG. 2). The key head may implement a function $\Gamma$ which may be a linear function mapping $\Gamma: \mathbb{R}^D \mapsto \mathbb{R}^{d_k}$. In this case, the support key embedding for a particular support image therefore has dimensions H'×W'×$d_k$. In one example, $d_k$=128, however it will be appreciated that other values are possible.

The query image features $\Phi(x_q)$ may be further processed by a query head to generate a query key embedding 203 (also referred to as "Queries (q)" as shown in FIG. 2). The query head may implement a function $\Omega$ and may also be a linear function mapping $\Omega: \mathbb{R}^D \mapsto \mathbb{R}^{d_k}$. The query key embedding for a query image may therefore also have dimensions H'×W'×$d_k$. The query head and key head may implement the same function, that is, $\Gamma=\Omega$. The query head and key head may be considered as part of the key embedding neural network subsystem 105. The function $\Phi(\cdot)$ may be a shared initial portion of the key embedding neural network subsystem 105 as discussed above. Alternatively, the image feature representations computed using the function $\Phi(\cdot)$ may be pre-computed externally and provided to the neural network system 100.

In FIG. 2, a plurality of attention maps 204 may then be generated by determining a similarity between each spatial feature of the query key embedding and each spatial feature of the support key embeddings for each respective support image. This process is illustrated for a particular spatial location p of the query key embedding in FIG. 2. In FIG. 2, the vector at location p of the query key embedding is compared to a vector at each spatial location of each of the support key embeddings by taking the dot product between the respective query key vector and respective support key vector. This results in the generation of an attention map, $a_j^c$, for each support image/key embedding for the query vector at location p and indicates the correspondence of the image feature at location p with the features of the support images at all possible spatial locations.

More concretely, the below equation provides an example calculation of the support key embedding, $$k_{jm}^c = \Gamma \cdot \Phi(x_j^c)_m$$

where $k_{jm}^c$ is the vector at spatial position m for the support key embedding of the j-th support image belonging to category c, and $x_j^c$ is the j-th support image belonging to category c. The below equation provides an example calculation of the query key embedding, $$q_p = \Omega \cdot \Phi(x_q)_p$$

where $q_p$ is the vector at spatial position p for the query key embedding. The next equation provides an example calculation of the attention map value corresponding to the spatial location pair p and m for the query key embedding and the support key embedding j, $$a_{jmp}^c = k_{jm}^c \cdot q_p$$

where $a_{jmp}^c$ is the attention map value for query key spatial location p and support key j at spatial location m.

Following the computation of the attention map values for every pair of spatial locations and for each support set image within a category, the attention map values may then be normalized by applying a softmax function across all spatial location pairs and attention maps belonging to the same support category, as shown in the following example equation:

$$\tilde{a}_{jmp}^c = \frac{\exp(a_{jmp}^c/\tau)}{\sum_{i,n} \exp(a_{inp}^c/\tau)}$$

where $\tau=\sqrt{d_k}$ and $\tilde{a}_{jmp}^c$ is a normalized attention map value.

It will be appreciated that the processing described above for generating attention maps may be implemented by the attention map subsystem 107.

As discussed above, a prototype for the particular category c in the support set can be generated based upon the attention maps 108 and the support value embeddings 104. In FIG. 2, the support set image features $\Phi(x_j^c)$ may be further processed by a value head to generate a support value embedding 205 for each respective support set image (also referred to as "Values $v^c$" as shown in FIG. 2). The value head may implement a function $\Lambda$ which may be a linear function mapping $\Lambda: \mathbb{R}^D \mapsto \mathbb{R}^{d_k}$. In this case, the support value embedding for a particular support image therefore has dimensions H'×W'×$d_v$. In one example, $d_v$=128, however it will be appreciated that other values may be possible. The value head may be considered as part of the value embedding neural network subsystem 109.

As shown in FIG. 2, the attention maps may be used to weight the corresponding support value embedding for the respective support image and a weighted sum performed to generate a vector of the prototype 206 at spatial location p. In this way, the attention maps provide an indication of which parts of the support image are most relevant based on the query image. The below example equation may be used to calculate the support value embedding at spatial location m for support image j associated with category c, $$v_{jm}^c = \Lambda \cdot \Phi(x_j^c)_m$$

where $v_{jm}^c$ is the vector at spatial location m of the support value embedding for the j-th support image for category c. The prototype may be calculated as shown in the following example equation, $$t_p^c = \sum_{jm} \tilde{a}_{jmp}^c v_{jm}^c$$

where $t_p^c$ is the vector at spatial location p of the prototype t for category c. The vectors at the remaining spatial locations of the prototype may be determined in similar manner. The prototype may be considered to be a "query-aligned" prototype in that the data generated for a particular location of the prototype corresponds to the particular feature at that same location of the query image. In some prior art techniques, prototypes are generated independently of the query and only based on the support data items themselves. In this case, each prototype is generated specifically taking into account the query and as such, can provide better determinations of the similarity between the query and prototypes of different categories.

As noted above, the similarity measure 112 between a query data item 101 and a support set of data items may be determined based upon a prototype for a particular category. For example, the similarity measure 112 may be determined based upon a Euclidean distance between query value embedding and the support value embedding. The query value embedding may be computed in a similar manner to the support value embedding by processing the query image features $\Phi(x^q)$ using value head $\Lambda$ as shown below, $$w_p = \Lambda \cdot \Phi(x^q)_p$$

where $w_p$ is the vector at spatial location p of the query value embedding. The similarity measure 112 may be computed based upon a Euclidean distance according to the following example equation, $$d(x_q, S^c) = \frac{1}{H'W'} \sum_p \|t_p^c - w_p\|_2^2$$

where $d(x_q, S^c)$ is the similarity measure between the query image and the support set for category c. It will be appreciated that the processing for determining the similarity measure may be implemented by the similarity subsystem 111.

The similarity measure may be used to determine a likelihood that the query image belongs to a particular category. For example, a softmax function may be applied to the similarity measures for each category to generate a probability distribution according to the following example equation:

$$p(y = c \mid x_q) = \frac{\exp(-d(x_q, S^c))}{\sum_{c'=1}^{C} \exp(-d(x_q, S^{c'}))}$$

where $p(y=c|x_q)$ is the probability that the query image $x_q$ belongs to category c. Alternatively, the similarity measure may be provided to a classifier to determine a set of scores for each category or to provide a classification of the query image. It will be appreciated the processing for generating classification scores/likelihoods may be implemented by the classifier sub system 113.

Figure 3:
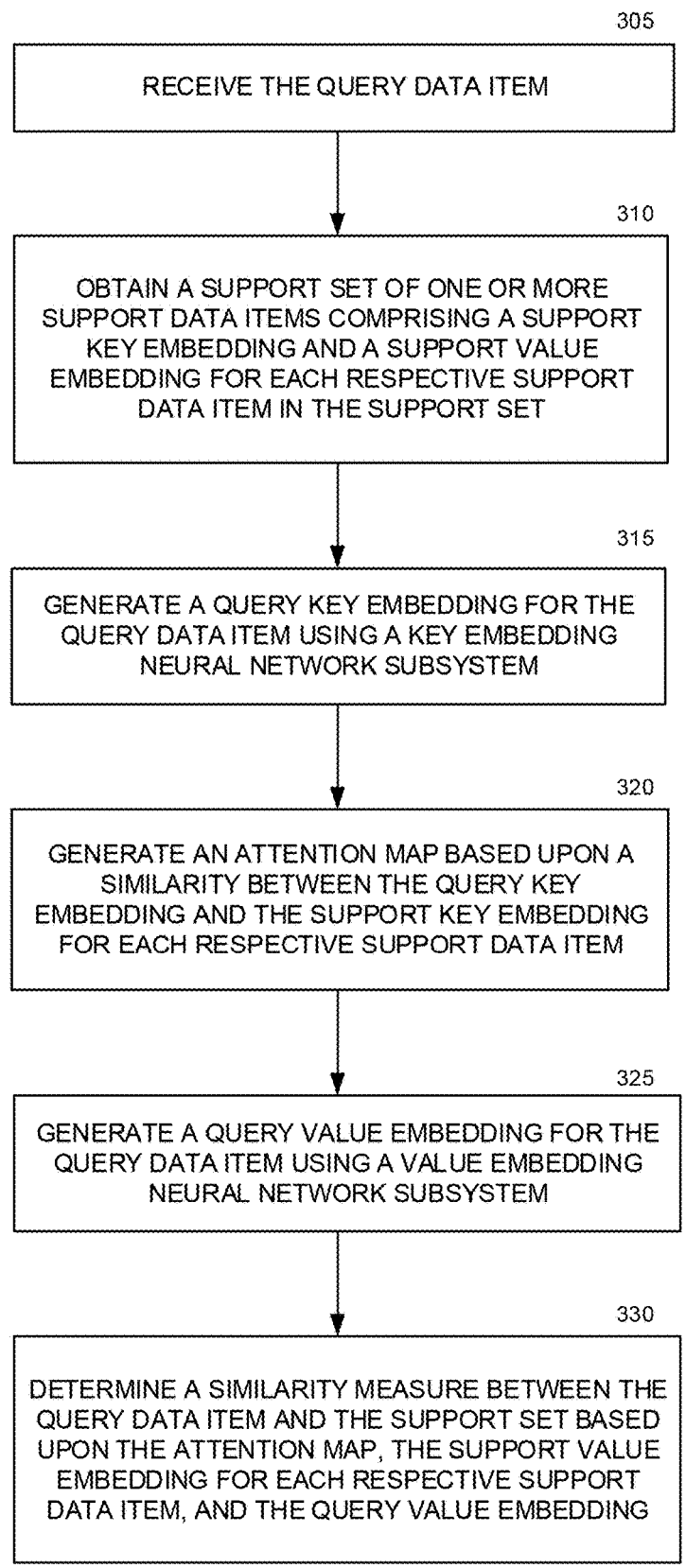
FIG. 3 is flow diagram of an example process for determining a similarity between a query data item and a set of support data items.

Referring now to FIG. 3, processing for determining a similarity measure between a query data item and a set of support data items will now be described. It will be appreciated that processing may be implemented by the neural network system 100 of FIG. 1.

At block 305, a query data item is received. At block 310, a support set of one or more support data items is received. The support set comprises a support key embedding and a support value embedding for each respective support data item in the support set.

At block 315, a query key embedding for the query data item is generated using a key embedding neural network subsystem. The key embedding neural network subsystem is configured to process a data item to generate a key embedding as described above.

At block 320, an attention map is generated based upon a similarity between the query key embedding and the support key embedding for each respective support data item. This may be performed using an attention map subsystem as described above.

At block 325, a query value embedding for the query data item is generated using a value embedding neural network subsystem. The embedding neural network subsystem is configured to process a data item to generate a value embedding as described above.

At block 330, a similarity measure is determined between the query data item and the support set based upon the attention map, the support value embedding for each respective support data item, and the query value embedding. This may be performed using a similarity subsystem as described above.

Figure 4:
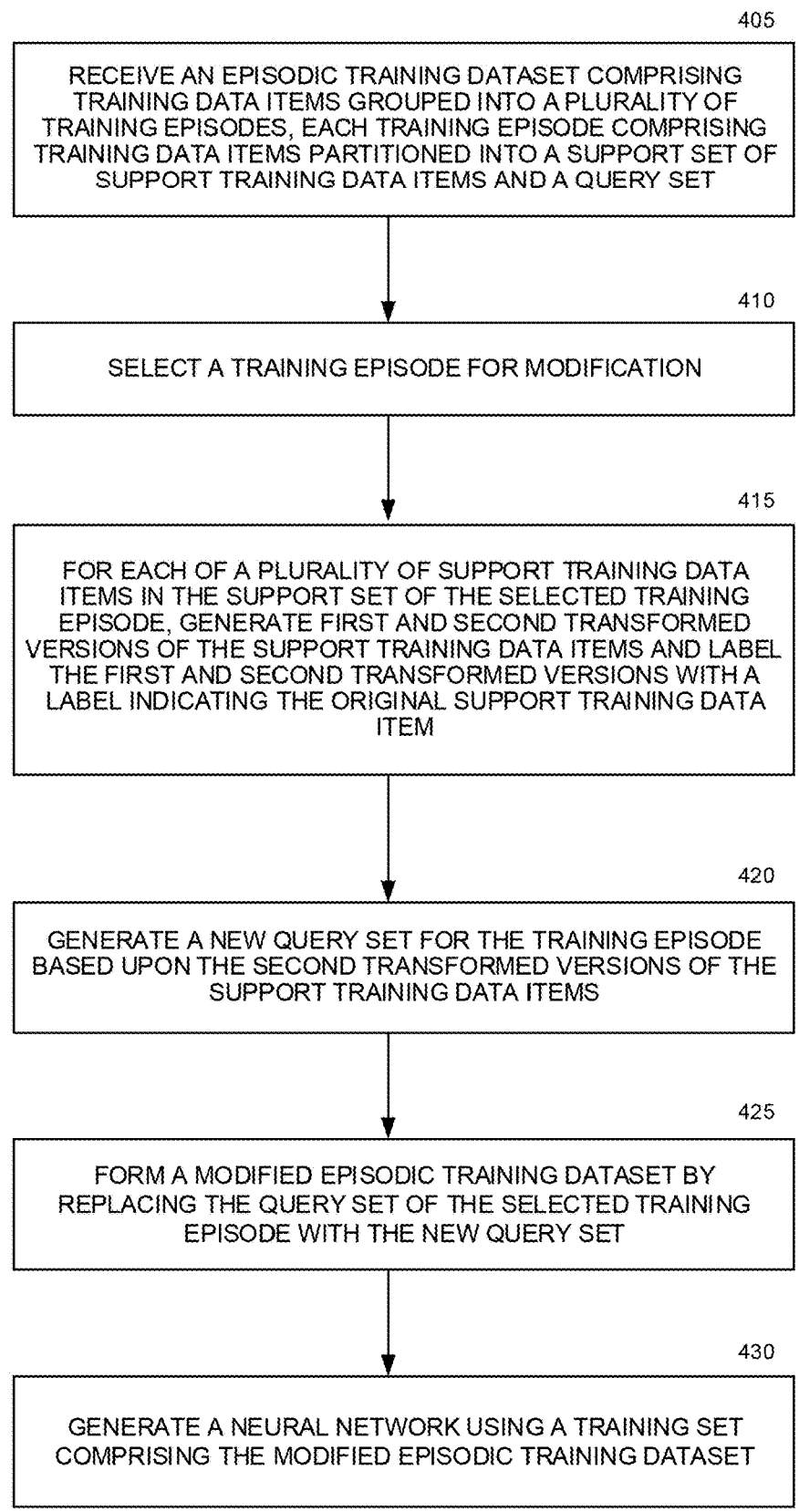
FIG. 4 is a flow diagram of an example process for training the neural network system.

Referring now to FIG. 4, processing for training a neural network system for determining a similarity measure between a query data item and a set of support data items will now be described. It will be appreciated that the neural network system 100 of FIG. 1 may be trained in accordance with the described processing.

At block 405, an episodic training dataset comprising training data items grouped into a plurality of training episodes is received. Each training episode comprises training data items partitioned into a support set of support training data items and a query set. The training episode may be designed for a classification task whereby data items in the query set are to be classified according the categories associated with the data items in the support set. The number of data items for each category in the support set may be limited. A suitable technique for generating an episodic dataset is set out in Triantafillou et. al., "Meta-Dataset: A Dataset of Datasets for Learning to Learn from Few Examples," arXiv: 1903.03096, which is hereby incorporated by reference in its entirety.

At block 410, a training episode is selected for modification. The training episode may be selected at random from the set of training episodes in the episodic training dataset.

At block 415, for each of a plurality of support training data items in the support set of the selected training episode, first and second transformed versions of the support training data items are generated and the first and second transformed versions are labelled with a label indicating the original support training data item. The transformation may be based upon a cropping operation, a color distortion operation or a Gaussian blur operation. Other example transformations may be based upon rotation, posterizing, solarizing, color shifts, contrast, brightness, sharpness, shear, translation, and cutout. The particular transformation operation and any parameters of the transformation operation may be selected at random from a set of suitable values.

At block 420, a new query set for the training episode is generated based upon the second transformed versions of the support training data items. For example, a subset of the second transformed versions may be selected to form the new query set. The subset may have the same number of data items as the original query set and may be selected according to the same category distribution as the original query set. It will also be appreciated that it is possible to first select a subset of the support training data items for the new query set and to only generate the second transformed versions for the subset rather than generating second transformed versions for every support data item.

At block 425, a modified episodic training dataset is formed by replacing the query set of the selected training episode with the new query set. The original support set may also be modified based upon the first transformed versions. For example, by replacing the original support set with the first transformed versions in the modified training episode.

The processing at blocks 410 to 425 may be repeated to select further training episodes for modification. In one example, half of the training episodes in the training dataset are modified according to the processing set out above.

At block 430, the neural network is generated using a training set comprising the modified episodic training dataset. The modification carried out to the training episodes described above means that the same loss function can still be used for both modified and unmodified training episodes. That is, in the modified training episodes, each support data item becomes its own class. The object of the modified training episode is to recognize the support data item each query data item is derived from. This can be posed as a classification problem under the same episodic learning framework as the original training episodes using the same classification or cross-entropy loss function. The neural network can then be training using standard techniques for supervised learning such as stochastic gradient descent and in particular, normalized stochastic gradient descent (which uses normalized gradients). The introduction of the modified training episodes helps to prevent the problem of supervision collapse whereby a neural network only learns representations useful for discriminating between classes present in the training set and does not retain any other information. Using the modified training episodes with the objective of recognizing transformed versions of a data item, encourages the neural network to retain information regarding the data items which produces a better representation that can generalize to unseen classes. For example, the neural network may learn to represent data items based upon local component parts which may be useful for representing data items of unseen classes.

Whilst in the above processing of FIG. 4, generating first and second transformed versions of a support training data item is described, it will appreciated that further transformed versions may be generated. The new query set and/or support set may be generated based upon these further transformed versions as deemed appropriate by a person skilled in the art.

FIG. 5 is an illustration of the correspondence between parts of a query image and images of the support set from attention maps generated by an exemplary neural network system. Correspondent parts indicated by large attention values are highlighted in the images. As can be seen from FIG. 5, semantically similar parts between the query image and the support images have high correspondence. For example, the tail, wings/engine and livery of the airplanes in FIG. 5 are highlighted. As such, the examples of FIG. 5 illustrates the efficacy of the techniques for determining a similarity measure between a query data item and support set of data items described above.

In situations in which the systems discussed here make use of data potentially including personal information, that data may be treated in one or more ways, such as aggregation and anonymization, before it is stored or used so that such personal information cannot be determined from the data that is stored or used. Furthermore, the use of such information may be such that no personally identifiable information may be determined from the output of the systems that use such information.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A neural network system for classifying a query image, the neural network system implemented by one or more computers and one or more storage devices storing instructions that when executed by the one or more computers cause the one or more computers to perform operations comprising:
    receiving the query image;
    obtaining a support set of one or more support images comprising a support key embedding and a support value embedding for each respective support image in the support set;
    processing the query image using a key embedding neural network comprising one or more first convolutional neural network layers and a first linear output layer to generate a query key embedding for the query image in accordance with trained values of a set of key embedding neural network parameters;
    generating an attention map based upon a similarity between the query key embedding and the support key embedding for each respective support image;
    processing the query image using a value embedding neural network comprising one or more second convolutional neural network layers and a second linear output layer, to generate a query value embedding for the query image in accordance with trained values of a set of value embedding neural network parameters;
    generating a respective prototype for each of a plurality of image categories associated with images in the support set, comprising:
        weighting the support value embeddings based upon the attention map; and
        aggregating the weighted support value embedding for the support images associated with a same category to generate a prototype for each image category associated with the support set;
    determining a respective similarity measure between the query value embedding and the prototype for each image category associated with the support set, wherein the respective similarity measure is based upon a distance between the query value embedding and the prototype; and
    classifying the query image as belonging to particular image category based on the determined similarity measures;
    wherein the set of key embedding neural network parameters and the set of value embedding neural network parameters have been trained using a machine learning training technique.

2. The neural network system of claim 1, wherein the operations further comprise:
    processing the support set of one or more support images using the key embedding neural network to generate the support key embedding for each respective support image in the support set.

3. The neural network system of claim 1, wherein the operations further comprise:
    processing the support set of one or more support images using the value embedding neural network to generate the support value embedding for each respective support image in the support set.

4. The neural network system of claim 1, wherein the distance is based upon a Euclidean distance.

5. The neural network system of claim 1, wherein the attention map is generated based upon an unscaled similarity measure between the query key embedding and the support key embedding for each respective support data item.

6. The neural network system of claim 1, wherein the similarity between the query key embedding and each prototype is based upon a dot product.

7. The neural network system of claim 1, wherein the similarity between the query key embedding and each prototype is based upon a similarity between a feature of the query key embedding and each respective feature of the prototype.

8. The neural network system of claim 7, wherein the features are spatial features.

9. The neural network system of claim 1, wherein the attention map is generated based upon a softmax function which receives the similarity measures between the query key embedding and the support key embedding for each respective support image of the same category.

10. A method performed by one or more computers for classifying a query image, the method comprising:
    receiving the query image;
    obtaining a support set of one or more support images comprising a support key embedding and a support value embedding for each respective support image in the support set;
    processing the query image using a key embedding neural network comprising one or more first convolutional neural network layers and a first linear output layer to generate a query key embedding for the query image in accordance with trained values of a set of key embedding neural network parameters;
    generating an attention map based upon a similarity between the query key embedding and the support key embedding for each respective support image;
    processing the query image using a value embedding neural network comprising one or more second convolutional neural network layers and a second linear output layer, to generate a query value embedding for the query image in accordance with trained values of a set of value embedding neural network parameters;
    generating a respective prototype for each of a plurality of image categories associated with images in the support set, comprising:
        weighting the support value embeddings based upon the attention map; and aggregating the weighted support value embedding for the support images associated with a same category to generate a prototype for each image category associated with the support set;

determining a respective similarity measure between the query value embedding and the prototype for each image category associated with the support set, wherein the respective similarity measure is based upon a distance between the query value embedding and the prototype; and classifying the query image as belonging to particular image category based on the determined similarity measures;

wherein the set of key embedding neural network parameters and the set of value embedding neural network parameters have been trained using a machine learning training technique.

11. The method of claim 10, further comprising:
processing the support set of one or more support images using the key embedding neural network to generate the support key embedding for each respective support image in the support set.

12. One or more non-transitory computer storage media storing instructions that when executed by one or more computers cause the one or more computers to perform operations for classifying a query image, the operations comprising:
receiving the query image;
obtaining a support set of one or more support images comprising a support key embedding and a support value embedding for each respective support image in the support set;
processing the query image using a key embedding neural network comprising one or more first convolutional neural network layers and a first linear output layer to generate a query key embedding for the query image in accordance with trained values of a set of key embedding neural network parameters;
generating an attention map based upon a similarity between the query key embedding and the support key embedding for each respective support image;
processing the query image using a value embedding neural network comprising one or more second convolutional neural network layers and a second linear output layer, to generate a query value embedding for the query image in accordance with trained values of a set of value embedding neural network parameters;
generating a respective prototype for each of a plurality of image categories associated with images in the support set, comprising:
weighting the support value embeddings based upon the attention map; and
aggregating the weighted support value embedding for the support images associated with a same category to generate a prototype for each image category associated with the support set;
determining a respective similarity measure between the query value embedding and the prototype for each image category associated with the support set, wherein the respective similarity measure is based upon a distance between the query value embedding and the prototype; and
classifying the query image as belonging to particular image category based on the determined similarity measures;
wherein the set of key embedding neural network parameters and the set of value embedding neural network parameters have been trained using a machine learning training technique.

13. The non-transitory computer storage media of claim 12, wherein the operations further comprise:
processing the support set of one or more support images using the key embedding neural network to generate the support key embedding for each respective support image in the support set.

14. The non-transitory computer storage media of claim 12, wherein the operations further comprise:
processing the support set of one or more support images using the value embedding neural network to generate the support value embedding for each respective support image in the support set.

15. The non-transitory computer storage media of claim 12, wherein the distance is based upon a Euclidean distance.

16. The non-transitory computer storage media of claim 12, wherein the attention map is generated based upon an unscaled similarity measure between the query key embedding and the support key embedding for each respective support data item.

17. The non-transitory computer storage media of claim 12, wherein the similarity between the query key embedding and each prototype is based upon a dot product.

18. The non-transitory computer storage media of claim 12, wherein the similarity between the query key embedding and each prototype is based upon a similarity between a feature of the query key embedding and each respective feature of the prototype.

* * * * *